1,983,284

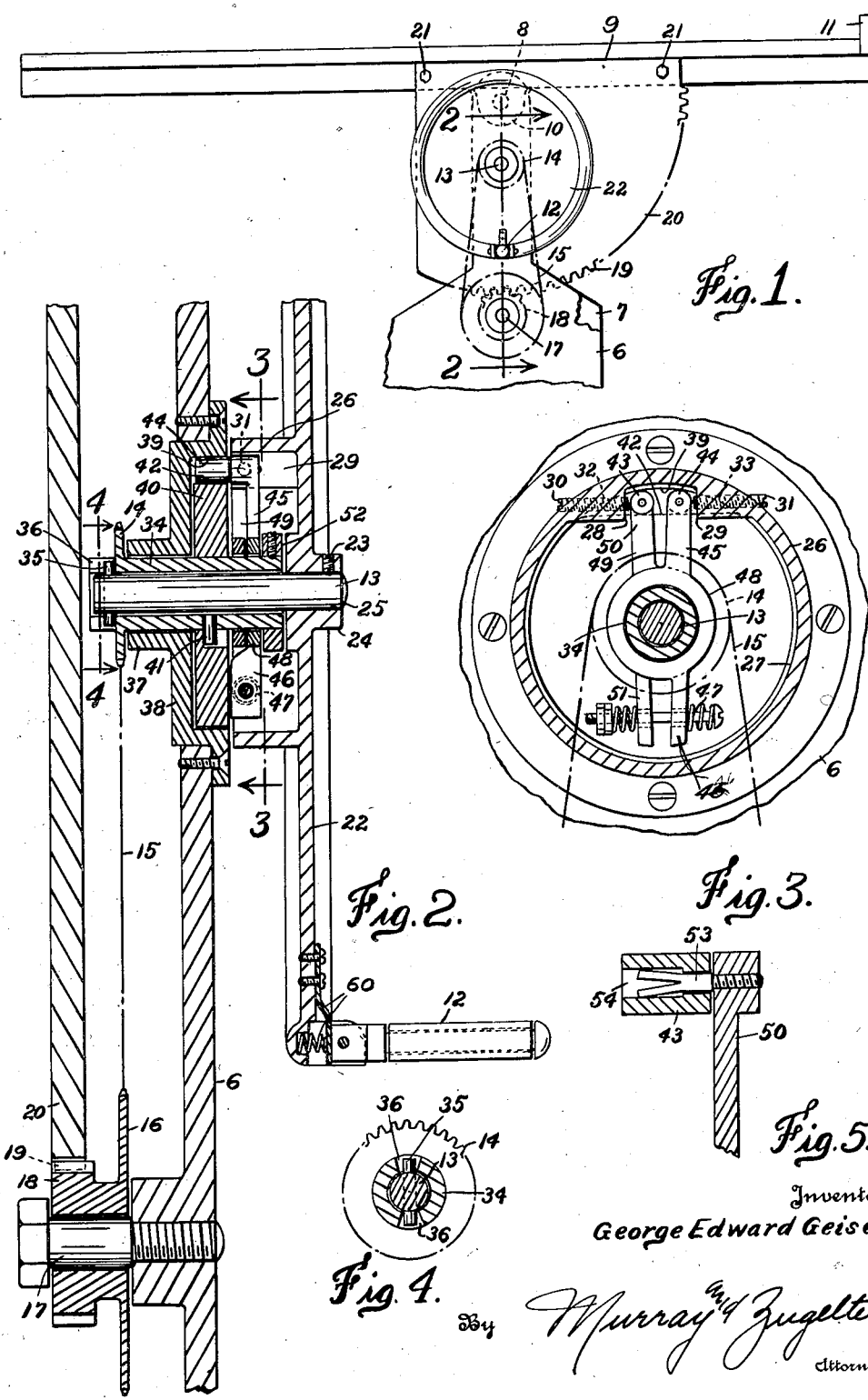
Dec. 4, 1934.  G. E. GEISE  1,983,284
HAND DRIVEN SELF LOCKING CLUTCH
Filed Feb. 15, 1932
Inventor
George Edward Geise Patented Dec. 4, 1934

UNITED STATES PATENT OFFICE 1,983,284

HAND DRIVEN SELF-LOCKING CLUTCH

George Edward Geise, South Fort Mitchell, Ky., assignor to The Kelley-Koeth Manufacturing Company, Covington, Ky., a corporation of Ohio Application February 15, 1932, Serial No. 592,906

9 Claims. (Cl. 311—6)

This invention relates to a hand driven self-locking clutch adapted for numerous uses, and which is herein shown and described in association with a tilting table for use in X-ray work and the like, commonly known as a fluoroscopic-diagnostic table.

An object of the invention is to provide a novel clutch that may be caused to actuate a driven member in either of two directions of rotation, but which will render impossible the transmission of motion upon attempting to rotate said driven member.

Another object of the invention is to provide a clutch of the character referred to above, which is constituted of a minimum number of inexpensive parts, and which will withstand considerable abuse.

A further object of the invention is to provide a tilting table for X-ray or similar use having associated therewith a clutch means whereby any movement of the patient while on the table cannot result in altering the adjustment of the table.

The foregoing and other objects are attained by the means described herein and disclosed in the accompanying drawing, in which:

Fig. 1 is a fragmentary side elevational view of an X-ray table embodying the invention.

Fig. 2 is a cross-sectional view taken on line 2—2 of Fig. 1 and showing the clutch means in cross-sectional detail.

Fig. 3 is a cross-sectional view taken on line 3—3 of Fig. 2.

Fig. 4 is a cross-sectional view taken on line 4—4 of Fig. 2.

Fig. 5 is a cross-sectional detail view showing one manner of connection between a wedge or roller and its supporting element.

In Fig. 1, 6 and 7 indicate a pair of spaced parallel uprights or standards each of which is provided, near its upper extremity, with a pivot means 8 whereby the table 9 may be tiltably mounted upon the standard. At 10 is indicated a conventional bracket depending from the under face of the tiltable table and in which bracket the pivot 8 is supported. It is understood, of course, that there is a bracket such as 10 along each lateral or side edge of the table 9. The reference character 11 indicates a foot board upon which a patient may stand when the table is disposed in an inclined position.

By the means of the instant invention, the table 9 may be disposed in various tilted positions, by the operation of a crank handle 12, but no amount of force applied to the table itself can alter the inclination of the table because of the irreversibility of the driving means connecting the table and the actuating handle.

As is clearly indicated in Figs. 1 and 2, the handle 12 may be actuated for rotating a shaft 13 which has driving relationship with a driven member 14 in the form of a sprocket, which sprocket 14 supports an endless chain 15 passing over a second sprocket 16 which is rotatably mounted upon the stud 17. A pinion 18 which is fixed relative to the sprocket 16, engages the teeth 19 of a gear segment 20 which is fixed to the table in any suitable manner, such as by means of bolts or other fastening means 21. It is evident from the foregoing that rotation of the shaft 13 by means of handle 12 will effect rotation of the gear segment and the table, through the medium of the driving means 14, 15 and 16. The shaft 13 may be rotated in either of its two directions of rotation by means of the handle 12, but an attempt to rotate said shaft by applying force or weight upon the table results in such locking of the clutching device as will preclude rotation of shaft 13 and handle 12.

The handle 12 has its mounting upon a wheel or disc 22 or equivalent element, which element 22 may have a driving connection with the shaft 13 by means of a set screw or the like 23. The set screw or securing means 23 may extend through a hub 24 which is provided with a bore 25 for reception of the shaft. Extending inwardly of the element 22 is a fixed integral flange 26 which is concentric with the bore of hub 24, this flange being characterized by a circular inner wall 27 which has extending inwardly therefrom the pair of spaced abutments 28 and 29. The abutments are rendered adjustable by the provision of the adjusting screws 30 and 31 which threadedly engage the threaded bores 32 and 33 provided in the abutments or lugs 28 and 29, respectively. The screws are movable toward and from one another, and they are preferably disposed in a common plane.

The inner ends of the opposed adjustable abutment screws constitute a wedge releasing means, or clutch release, as will more clearly manifest itself in the explanation following.

The driven member 14 includes a sleeve portion 34 which loosely fits and surrounds the shaft 13. The shaft and sleeve portion are adapted for rotation in unison by the provision of a lost-motion coupling which may conveniently be located at the inner end of the shaft and constituted by the pin 35 engaging the slightly enlarged opposed slots 36 formed in the sleeve, (see Figs. 2 and 4). The pin is fixed relative to the shaft. Thus there is provided a lost motion connection between the driven member 14 and the wedge releasing means 30—31 of flange 26.

The bored hub 37 of a stationary housing member 38 provides a bearing in which the sleeve 34 may rotate. This housing member preferably is circular and provides a smooth inner cylindrical wall 39 which serves as one of two wedge areas or faces characterizing the clutch. Within the confines of the cylindrical wall 39 is disposed a plate or disc member 40, herein shown as being substantially circular, by preference, which member 40 is pinned or otherwise secured to the sleeve 34 for rotation therewith, as at 41. The member 40 has part of its circumference removed to provide the abutment or flat 42 which extends as a chord across the curved periphery of the plate member 40, and said flat or abutment provides a second wedge face.

It will be noted that the wedge faces 39 and 42 have disposed between them the wedges 43 and 44 which may be in the form of rollers, as shown. Roller or wedge 44 is rotatably mounted upon one end of a wedge supporting arm or element 45, the other end 46 of which supports a spring means 47. The element 45 is provided also with an enlarged circular bearing means 48 whereby it may be supported for slight rocking movement upon the sleeve portion 34. Similarly, a second wedge supporting element 49, similar to that indicated at 45, carries at its one extremity 50 the wedge or roller 43 while at its opposite extremity 51 it cooperates with end 46 to support the spring or yielding means 47 (Fig. 3). Both of the wedge supporting elements have a loose fit on the sleeve 34 and they may be maintained in close or abutting relationship on the sleeve by means of a collar or the like 52.

One form of means for rotatably mounting the wedge rollers upon the wedge supporting elements is shown in Fig. 5, wherein 53 represents a stud bifurcated at one end and spread apart within a recess 54 of the roller 43.

The operation of the device is as follows:

In the normal condition of rest, the wedges 43 and 44 of the device are in wedging relationship between the wedge walls 39 and 42, and the inner ends of screws 30 and 31 are slightly spaced from the wedge supporting arms 45 and 49, as indicated in Fig. 3. By reference to Fig. 3 it will readily be understood that rotation of the member 26 in a clockwise direction by means of the actuating handle, will cause the inner end of screw 30 to strike the wedge supporting arm 50 and move the wedge out of wedging relationship with the walls 39 and 42. Said movement of the wedge from the wedging relationship is accomplished by overcoming the tendency of the spring means 47 to normally maintain the wedges in the wedging relationship. Should the member 26 be rotated in the opposite, or counterclockwise direction, the inner end of screw 31 will be moved against the upper end of arm 45, and dislodge the wedge 44 from its wedging relationship between walls 39 and 42, against the resistance of the spring means 47. Thus it will be apparent that the means 26—22—12 may be rotated in either of its two directions of rotation without opposition from the wedging or clutching action of the device. Upon dislodging of either of the wedge rollers, the rotational movement of the wheel 22 transmits power directly through the shaft 13, pin 35, and the driven means 14 which drives the sprocket 16 by means of the connecting chain.

It should readily be evident that the slight movement of members 22, 26, 30 and 31, which is necessary for dislodging the wedges, is afforded by means of the lost motion coupling provided at 35—36. After this lost motion is taken up, the element 14 receives positive driving movement from the shaft 13 for effecting movement of the segment 20 and tilting of the table 9.

Assuming now that an attempt is made to tilt the table by applying an upward or downward force at an end of the table 9, it will be observed that the chain 15 will tend to rotate the sprocket 14 and sleeve 34. The sleeve 34, however, has fixedly mounted thereon the disc or plate 40 which provides the wedge face 42. This wedge face 42, however, is in wedging relationship with both of the wedge rollers 43 and 44, and with the second wedge face 39 of the housing 38, the wedging action therebetween being maintained constantly by the action of the yielding means 47 which constantly urges the wedge rollers against the convergent wedging faces 42 and 39. Therefore, regardless of the direction of rotation attempted in rotating the sprocket 14, the sprocket, the sleeve 34, the wedge plate 40 and the wedge rollers are all locked immovably against the wedge face 39 of the stationary housing 38.

When the device is properly operated by means of the handle 12, the following parts rotate as a unit; disc 22, flange 26, members 43, 44, 45 and 49, plate 40, sleeve 34, sprocket 14, and shaft 13.

The operating handle 12 preferably is of a type which can be folded against the member 22 so as not to provide an obstruction preventing the operator's safely walking about the table without accidently altering the angle of inclination of the table while in use. It should readily be apparent that the spring means 60 will yield and allow for disposing the handle 12 in substantially the plane of the wheel or disc 22.

It is to be understood that various modifications and changes in structural details of the device may be made, within the scope of the appended claims, without departing from the spirit of the invention.

What is claimed is:

1. A fluoroscopic-diagnostic table comprising in combination a frame, a pivoted table member adapted to be tilted to various inclined positions, a quick-acting mechanism including a rotatable driving shaft journalled in the frame and associated with the table member for effecting rapid tilting of the table member, and a positive self-locking clutch device operating independently of said tilting mechanism for rendering the tilting mechanism irreversible, said clutch device including the drive shaft of the tilting mechanism, a wedge confining drum fixed to the frame in substantial concentricity with said shaft, and wedge means cooperating with said shaft and drum.

2. A fluoroscopic-diagnostic device comprising in combination a supporting means, a table pivoted upon the supporting means whereby the table may be tilted to various degrees of inclination, a toothed member movable with the table, a pinion engaging the toothed member and mounted for rotational movement upon the supporting means, a shaft mounted upon the supporting means for rotational movement; and means for rotating the shaft, a power transmission connection between the shaft and the pinion, and a positive self-locking clutch operating independently of said power transmission connection for precluding rotation of the shaft rotating means by the pinion while permitting rotation of the pinion by the shaft rotating means.

3. A fluoroscopic-diagnostic device comprising in combination a supporting means, a table pivoted upon the supporting means whereby the table may be tilted to various degrees of inclination, a toothed member movable with the table, a pinion engaging the toothed member and mounted for rotational movement upon the supporting means, a shaft mounted upon the supporting means for rotational movement, and means for rotating the shaft, a power transmission connection between the shaft and the pinion, and a positive self-locking clutch operating independently of said power transmission connection and including wedges and wedge faces normally held in wedging relationship and cooperatively related to the shaft rotating means for releasing only upon movement of the shaft rotating means, thereby precluding rotation of the shaft rotating means by the pinion while permitting rotation of the pinion by the shaft rotating means.

4. The combination of a driven member and a stationary support therefor, an actuating shaft, a shaft rotating means, a lost motion driving connection between the driven member and the shaft rotating means, stationary wedge surfaces on the stationary support, a plate mounted for movement with the driven member, wedge surfaces on the plate spaced from the wedge surfaces of the stationary support and disposed eccentrically thereto, a pair of wedge members disposed between the wedge surfaces, means comprising yieldingly urged arms for supporting the wedge members in position for normal wedging engagement with the wedge surfaces, a pair of abutments movable with the shaft rotating means each being disposed for striking one of the yielding arms and displacing its associated wedge member upon rotational movement of the shaft rotating means through a portion of the lost motion period afforded by the lost motion connection, a table supported for movement to various inclined positions, and motion transmitting means connecting the table and the said driven member.

5. A physician's adjustable table comprising in combination a supporting frame, a table member pivoted upon the supporting frame for tilting movement to various degrees of inclination, a quick-acting mechanism associated with the table member for effecting rapid tilting of the table member, and a positive self-locking clutch device rendering the tilting mechanism irreversible said device including a rotatable sleeve and a support therefor, a power transmission means carried by the sleeve and associated with the table tilting means, a shaft having a lost motion connection with the sleeve, a shaft rotating means, opposed pairs of relatively movable wedge surfaces one of each pair being movable with the sleeve, wedges supported between the wedge surfaces and normally held in wedging relationship therewith, and means operating upon movement of the shaft rotating means during the lost motion period afforded by said lost motion connection, for moving the wedges from the normal wedging relationship while the shaft rotating means is operated to rotate the sleeve and the power transmission means of the table tilting mechanism.

6. A physician's adjustable table comprising in combination a supporting frame, a table member pivoted upon the supporting frame for tilting movement to various degrees of inclination, a quick-acting mechanism associated with the table member for effecting rapid tilting of the table member, and a positive self-locking clutch device rendering the tilting mechanism irreversible said device including a rotatable sleeve and a support therefor, a power transmission means carried by the sleeve and associated with the table tilting means, an actuating shaft, a shaft rotating means, a lost motion connection between the rotatable sleeve and the shaft rotating means, wedge means normally locking the sleeve member to the supporting frame, and means for displacing one of the wedge means upon movement of the shaft rotating means through a portion of the lost motion period afforded by the lost motion connection.

7. A physician's adjustable table comprising in combination a supporting frame, a table member pivoted upon the supporting frame for tilting movement to various degrees of inclination, a quick-acting mechanism associated with the table member for effecting rapid tilting of the table member, and a positive self-locking clutch device rendering the tilting mechanism irreversible said device including a driven member and a stationary support therefor, an actuating shaft, a shaft rotating means, a lost motion connection between the driven member and the shaft rotating means, wedge means normally locking the driven member to the stationary support, means for displacing one of the wedge means upon movement of the shaft rotating means in one direction through a portion of the lost motion period afforded by the lost motion connection, and means for displacing the other wedge means when the shaft rotating means is rotated in the opposite direction.

8. A device of the class described comprising in combination a supporting frame including a substantially vertical standard, a table member pivoted for tilting movement adjacent to the top of said standard, a gear segment fixed to the table member and depending therefrom in substantial parallelism with said standard, a toothed pinion rotatably supported upon the standard in the plane of the segment, with the teeth of the pinion in engagement with the teeth of the gear segment, a unitary self-locking clutch mounted upon the standard near the top thereof and remote from the pinion, said clutch including a handle-rotated shaft, and means for transmitting rotational movement of said shaft to said pinion.

9. A device of the class described comprising in combination a supporting frame including a substantially vertical standard, a table member pivoted for tilting movement adjacent to the top of said standard, a gear segment fixed to the table member and depending therefrom in substantial parallelism with the standard at one side of the standard, a toothed rotatable pinion, and a mounting therefor upon the standard, the teeth of the pinion being in engagement with the teeth of the gear segment, a unitary self-locking clutch removably mounted upon the standard at a convenient operating height and remote from the pinion mounting, a rotatable shaft extending through the clutch and through the standard, an operating handle on one end of said shaft the handle being disposed at the opposite side of said standard, and means adjacent to the other end of the shaft for transmitting rotational movement of said shaft to said pinion.

GEORGE EDWARD GEISE.

CERTIFICATE OF CORRECTION.

Patent No. 1,983,284.  December 4, 1934.

GEORGE EDWARD GEISE.

It is hereby certified that the name of the assignee in the above numbered patent was erroneously written and printed as "The Kelley-Koeth Manufacturing Company" whereas said name should have been written and printed as The Kelley-Koett Manufacturing Company, as shown by the records of assignments in this office; and that the said Letters Patent should be read with this correction therein that the same may conform to the record of the case in the Patent Office.

Signed and sealed this 19th day of February, A. D. 1935.

Leslie Frazer
Acting Commissioner of Patents.

(Seal)